United States Patent
Matsubara et al.

(10) Patent No.: US 6,504,068 B1
(45) Date of Patent: *Jan. 7, 2003

(54) METHOD FOR CONVERTING A PLASTIC WASTE INTO OIL IN A STAINLESS STEEL REACTOR

(75) Inventors: Wataru Matsubara, Hiroshima-ken (JP); Hiroshi Makihara, Hiroshima-ken (JP); Kazuto Kobayashi, Hiroshima-ken (JP); Masaki Iijima, Tokyo (JP)

(73) Assignee: Mitsubishi Jukogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/870,623

(22) Filed: Jun. 6, 1997

(30) Foreign Application Priority Data

Jun. 6, 1996 (JP) ............................................. 8-144213

(51) Int. Cl.⁷ .............................. C07C 1/00; C01G 1/10
(52) U.S. Cl. ...................... 585/240; 585/241; 585/832; 208/262.1; 208/400; 208/952; 201/2.5; 201/25
(58) Field of Search ................................ 585/240, 241, 585/832; 208/262.1, 400, 952; 201/2.5, 25

(56) References Cited

U.S. PATENT DOCUMENTS

| 4,113,446 A | | 9/1978 | Modell et al. .................. 48/202 |
| 4,338,199 A | | 7/1982 | Modell ......................... 210/721 |
| 4,652,686 A | * | 3/1987 | Coenen et al. .............. 585/240 |
| 5,368,723 A | * | 11/1994 | Takahashi et al. ........... 208/427 |
| 5,386,055 A | | 1/1995 | Lee et al. ................. 562/512.2 |
| 5,502,262 A | * | 3/1996 | Yamasaki et al. ........... 585/241 |
| 5,608,136 A | * | 3/1997 | Maezawa et al. ........... 588/228 |
| 5,639,937 A | * | 6/1997 | Hover et al. ................ 585/241 |
| 5,728,910 A | * | 3/1998 | Matsubara et al. .......... 585/241 |

FOREIGN PATENT DOCUMENTS

| EP | 0 344 376 | 12/1989 |
| JP | 56-501205 | 8/1981 |
| JP | 57-4225 | 1/1982 |
| JP | 5-31000 | 2/1993 |
| JP | 6-279762 | 10/1994 |
| WO | WO 81/00855 | 4/1981 |
| WO | WO 93/18112 | 9/1993 |

* cited by examiner

Primary Examiner—Nadine G. Norton
(74) Attorney, Agent, or Firm—Foley & Lardner

(57) ABSTRACT

A method of converting a plastic waste into oil by decomposing the plastic waste by a reaction using water in a supercritical or near supercritical region as a reaction medium. In this method, the reaction is conducted by using a tubular continuous reactor. The present invention further provides an apparatus therefor. Moreover, the present invention provides a method of converting a plastic waste into oil by conducting the reaction after hydrogen chloride is removed by performing the pyrolysis of the plastic waste in the case that the plastic waste contain chlorine. The present invention further provides an apparatus for performing this method.

12 Claims, 4 Drawing Sheets

METHOD FOR CONVERTING A PLASTIC WASTE INTO OIL IN A STAINLESS STEEL REACTOR

BACKGROUND OF THE INVENTION

1. Field of the Invention

The present invention relates to a method of decomposing a plastic waste by a chemical reactions, in which water in a supercritical or near supercritical region is used as a reaction medium, and thereby converting the plastic waste into oil, and further relates to an apparatus therefor.

2. Description of the Related Art

Hitherto, almost all of the plastic waste of various types have been dumped on a land reclamation site or have been burned and thus have not been effectively utilized as resources. Further, in the case of dumping the plastic waste on a reclaimed land, it is difficult to secure a land or ground to be reclaimed and the reclaimed ground is unstable. Further, in the case of burning the plastic waste, there have been caused the problems that because these wastes are high-calorie solids, an incinerator is badly damaged and that the plastic waste gives off a poisonous gas and a foul odor during incineration thereof.

In such a context, in recent years, attempts have been made to develop a method for recycling and reusing a plastic waste without pollution, and for effectively utilizing the recycled plastics as resources. As one of such methods, there has been proposed a method (namely, what is called a supercritical water method or process) of decomposing a plastic waste by a reaction (namely, a supercritical water reaction), which uses water in a supercritical region (namely, supercritical water) or water near the supercritical region (namely, near supercritical water) as a reaction medium, to thereby convert the plastic waste into oil and of collecting useful oil-like materials (refer to Japanese Patent Provisional Publication 56-501205 corresponding to WO81/00855 and Japanese Patent Provisional Publication Nos. 57-4225, 5-31000, 6-279762, and U.S. Pat. No. 4,113,446; all of these references are incorporated herein by reference).

Supercritical water is defined as water that is in conditions in which the temperature is critical temperature (namely, 374° C.) of water or higher and the pressure is the critical pressure (namely, 22.1 MPa) or higher. In the case of the supercritical water method, the quantity of generated gas is low and the amount of a residue is small, in comparison with the case of utilizing thermolysis at ordinary pressure. Thus, a high oil conversion ratio, at which a plastic waste is converted into oil, can be realized. Incidentally, even if the pressure of water is not higher than the critical pressure, the water acting as a reaction medium behaves almost similarly as supercritical water does when the pressure thereof is close to the critical pressure (namely, the ratio of the pressure thereof to the critical pressure is 0.8 or more).

However, with the current state of the art, techniques for treating a plastic waste according to the supercritical water method have not been sufficiently clearly established yet. Especially, from the point of view of the speed-up of the reaction and the treatment (or disposal) of large amounts of plastic waste, the current techniques may not be effective and are not suitable for industrialization. Namely, in the case of the treatment of by the conventional supercritical water method, a batch treatment is performed (by a reactor of the autoclave type) at a temperature of 400° C. or so, with the result that it takes long time, which is 30 minutes or more, to perform the decomposition of a plastic waste and convert the plastic waste into oil. Moreover, it is difficult to treat large amounts of plastic waste.

Furthermore, when the plastic waste contains chlorine-base (or chlorine-containing) plastic such as vinyl chloride resin, there are caused the problems that the corrosion of the reactor and piping is effected by hydrogen chloride produced by the decomposition of the chlorine-base plastic contained in the plastic waste during the decomposition of the plastic waste and the conversion thereof into oil. Namely, a supercritical water-reaction is effected in high-temperature water. Further, hydrogen chloride is ionized and chlorine ions are dissociated therefrom. Thus, conditions for acclerating the corrosion are produced. Consequently, the conventional treatment of a plastic waste by the supercritical water method has encountered another problem that metallic materials are seriously corroded.

Therefore, in the case that a plastic Waste containing chlorine-base plastic is decomposed and converted into oil by the supercritical water method, it is very difficult to select the metallic materials for the reactor and piping. Thus, heretofore, in the case of using the supercritical water method, with the existing state of the art, only a plastic waste containing no chlorine-base plastic has been converted into oil after the chlorine-base plastic is fractionated and separated from the plastic waste by a pretreatment. The present invention is accomplished in view of such a state of the conventional art.

SUMMARY OF THE INVENTION

Accordingly, a first object of the present invention is to provide a method and apparatus of treating a plastic waste, which is suitable for industrialization and can decompose a plastic waste and convert the plastic waste into oil at a high speed in a supercritical water process for treating a plastic waste and further can treat large amounts of plastic waste.

Further, a second object of the present invention is to provide a method and apparatus of treating a plastic waste, which can effectively suppress the corrosion of the apparatus due to hydrogen chloride generated during, the decomposition of the plastic waste and the conversion thereof into oil.

To achieve the foregoing objects, in accordance with an aspect of the present invention, there is provided a method of decomposing a plastic waste by a reaction using water in a supercritical or near supercritical region as a reaction medium and converting the plastic waste into oil, which comprises the step of carrying out the reaction in a tubular type continuous reactor.

It is preferable that the residence time of the plastic waste in the reactor is 5 minutes or less when conducting the reaction according to this method of converting the plastic waste into oil.

Further, in accordance with another aspect of the present invention, there is provided a method of decomposing a plastic waste by a reaction using water in a supercritical or near supercritical region as a reaction medium and converting the plastic waste into oil, which comprises the steps of: heating a plastic waste to decompose part or all of chlorine-base plastic included in the plastic waste and separate and remove generated hydrogen chloride therefrom; and conducting the reaction by mixing the plastic waste, from which the hydrogen chloride is separated, with water.

In the case of this method of converting a plastic waste into oil, it is preferable that a tubular type continuous reactor is used as the reactor for conducting the reaction.

Further, in such a case of this method of converting a plastic waste into oil, it is preferable that the residence time of the plastic waste in the reactor is 5 minutes or less when conducting the reaction according to this method of converting the plastic waste into oil.

Moreover, in accordance with still another aspect of the present invention, there is provided an apparatus for decomposing a plastic waste by a reaction using water in a supercritical or near supercritical region as a reaction medium and for converting the plastic waste into oil, which comprises a tubular type continuous reactor as a reactor for conducting the reaction.

Furthermore, in accordance with yet another aspect of the present invention, there is provided an apparatus for decomposing a plastic waste by a reaction using water in a supercritical or near supercritical region as a reaction medium and for converting the plastic waste into oil, which comprises: a hydrogen-chloride decomposing/removing mechanism for heating a plastic waste to decompose part or all of chlorine-base plastic contained in the plastic waste and separate and remove generated hydrogen chloride therefrom; and a reactor for decomposing the plastic waste, from which the hydrogen chloride is separated, by conducting the reaction.

Additionally, in the case of this apparatus for converting a plastic waste into oil, it is preferable that a tubular type continuous reactor is used as the reactor for conducting the reaction.

In accordance with the present invention, the decomposition of a plastic waste and the conversion thereof into oil are performed by a supercritical water reaction. As described above, supercritical water is defined as water whose temperature is at the critical temperature of water or higher and whose pressure is at the critical pressure of water or higher. However, even if the pressure of this water is not higher than the critical pressure, the behavior of the water acting as a reaction medium results in its showing activity which is almost similarly as of supercritical water when the pressure thereof is close to the critical pressure (namely, the ratio of the pressure thereof to the critical pressure is 0.8 or more). Therefore, supercritical water reactions according to the present invention include those caused in the case that the pressure of supercritical water is operated in the vicinity of the critical pressure of water.

The aforementioned methods and apparatuses of the present invention use tubular type continuous reactors as the reactors for conducting supercritical water reactions. A tubular type continuous reactor is one adapted to perform the decomposition of a plastic waste therein and the conversion of the plastic waste into oil by permitting a mixture of water, whose condition is maintained in a supercritical or near supercritical region, and the plastic waste to continuously flow therethrough. As a more practical example of such a reactor, a multitubular type reactor constituted by tying a plurality of thick-walled reaction tubes in a bundle can be mentioned. The reaction tubes can be made from suitable metals such as stainless steel.

Further, the present invention, which relates to the aforesaid methods and apparatuses, aims at suppressing the corrosion of the apparatuses used in supercritical water reactions by heating a plastic waste to decompose part or all of chlorine-base plastic contained in the plastic waste and separate and remove generated hydrogen chloride, which is in a gaseous state, therefrom, before the step of mixing a plastic waste with water, hot water or supercritical water, for conducting supercritical water reactions. In this case, it is necessary for carrying out a supercritical reaction to mix the plastic waste with water or the like after separating and removing hydrogen chloride produced by the decomposition of chlorine-containing plastic. If a plastic waste is mixed with water or the like before separating and removing gaseous hydrogen chloride, the hydrogen chloride is ionized and chlorine ions are dissociated therefrom. This accelerates the corrosion of the apparatus. Thus, the objects of the present invention are not achieved.

However, the decomposition of a plastic waste and the conversion of the plastic waste into oil can be achieved in a short time which is 5 minutes or less, by using the tubular type continuous reactor as the reactor and by treating the plastic waste at temperatures which are a specific temperature or higher. Thereby, a large amount of a plastic waste can be continuously treated or processed.

Although the methods of the present invention are to perform the decomposition of a plastic waste and the conversion of the plastic waste into oil under supercritical conditions, the range of preferable reaction temperatures varies with the kind of plastic that is a main part of the plastic waste. To carry out a reaction in a short time, it is preferable to set the reaction temperature at a value that is 410° C. or higher. For instance, in the case of the plastic waste mainly composed of a polystyrene resin or a methacrylic resin, the temperatures ranging from 410 to 600° C. are preferable. Further, the temperatures ranging from 420 to 480° C. are particularly preferable. Moreover, in the case of the plastic waste mainly composed of polyethylene, polypropylene, polyvinyl chloride, polyvinylidene chloride, ABS resin, polyvinyl alcohol, polycarbonate, polyester resin or polyamide, the temperatures ranging from 480 to 600° C. are preferable. Further, the temperatures ranging from 490 to 550° C. are particularly preferable.

The reaction pressure is set in such a manner as to be equal to or higher than the critical pressure of water, or to be close to the critical pressure thereof. In view of the speed-up of a reaction and the allowable operating temperature and the permissible working pressure of materials used in the reactor, further preferable pressures range from 18 to 50 MPa. Particularly preferable pressures range from 22.1 to 35 MPa.

In the case of the methods and apparatuses of the present invention, a plastic waste is mixed with water, hot water or supercritical water to thereby cause a supercritical water reaction. The plastic waste may be mixed with such supercritical water or the like while the plastic waste is heated and melted. Alternatively, the plastic waste, which is crushed into fragments, may be mixed with such supercritical water or the like.

Further, if a chlorine-containing plastic such as polyvinyl chloride and polyvinylidene chloride is included in a plastic waste, the corrosion of the apparatus occurs when conducting a supercritical water reaction, as above described. Therefore, if a plastic waste including such chloride-containing plastic is treated, it is preferable that the hydrogen-chloride decomposing/removing mechanism is provided in the apparatus, before performing the step of mixing the plastic waste with water, hot water or supercritical water, and that thus the plastic waste is heated and melted to thereby decompose part or all of chlorine-base plastic contained in the plastic waste and separate and remove generated gaseous hydrogen chloride therefrom.

Heating temperature, at which the plastic waste is heated for removing hydrogen chloride therefrom, is suitably set according to the composition and properties of the waste. Because the generation of decomposition gases other than hydrogen chloride should be suppressed, the preferable heating temperatures range from 200 to 400° C. Further, particularly preferable heating temperatures range from 250 to 350° C.

In the case of the methods and apparatuses of the present invention, a plastic waste can be efficiently decomposed and converted into oil in a short time by using a tubular type continuous reactor as a reactor. Thereby, a large quantity of a plastic waste can be continuously treated. Moreover, the methods and apparatuses of the present invention are made to be more effective by setting the reaction temperature at a value within a specific range according to the kind of a plastic waste which is a major constituent of the plastic waste. Namely, the present invention enables the speed-up of the reaction and the continuous treatment of large amounts of plastic waste. Moreover, a reduction in size of the reactor can be achieved. Thus, the industrialization of the treatment of a plastic waste by the supercritical water method can be attained.

Furthermore, in the case of the method and apparatus of the present invention, when the decomposition of a plastic waste containing chlorine-base plastic and the conversion of the plastic waste into oil are carried out as a result of performing the supercritical water process by conducting a supercritical water reaction after removing hydrogen chloride by performing the pretreatment of a plastic waste, the corrosion of the apparatus due to hydrogen chloride generated from the chlorine-base plastic can be suppressed effectively.

Additionally, oil-like materials, which contain almost no chlorine ingredient and can be effectively utilized as fuel oil, can be collected in good yield from a plastic waste containing chlorine-base plastic.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, the preferred embodiments of the present invention will be described in detail by referring to the accompanying drawings.

Figure 1:
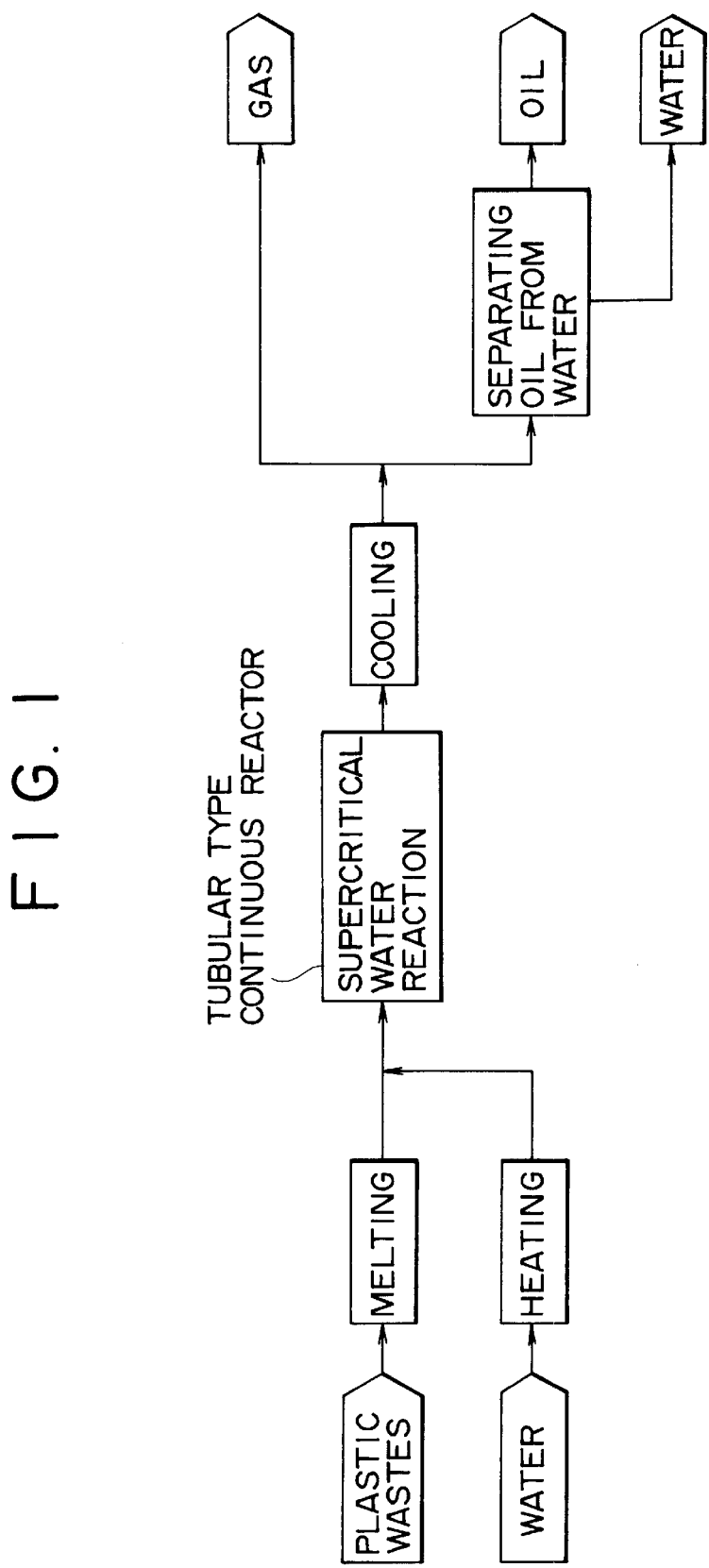
FIG. 1 is a system flowchart illustrating an embodiment of the present invention, which is a method and apparatus embodying the present invention.

Referring to FIG. 1, there is shown a system flowchart illustrating a method and apparatus embodying the present invention, namely, an embodiment of the present invention. Namely, this embodiment does not have the step of removing hydrogen chloride. Further, the decomposition of a plastic waste and the conversion of the plastic waste into oil are performed in the following steps (1) to (3).

In step (1), pretreatments, such as crushing, separating and fractionating are performed on a plastic waste, if necessary. Thereafter, the plastic waste is heated and melted. At that time, generated decomposition gas may be separated therefrom, and may be further cleaned and collected or may be neutralized.

In step (2), the plastic waste and the water are pressurized, upon completion of the treatment of the aforementioned step (1). Thereafter, the plastic waste is mixed with the water. Moreover, a supercritical water reaction is conducted by using a tubular type continuous reactor under the aforementioned temperature and pressure conditions. In this case, after mixing the plastic waste with water or hot water, the mixture may be heated in such a manner as to be in a supercritical or near supercritical region. Alternatively, the plastic waste may be mixed with supercritical water.

Figure 2:
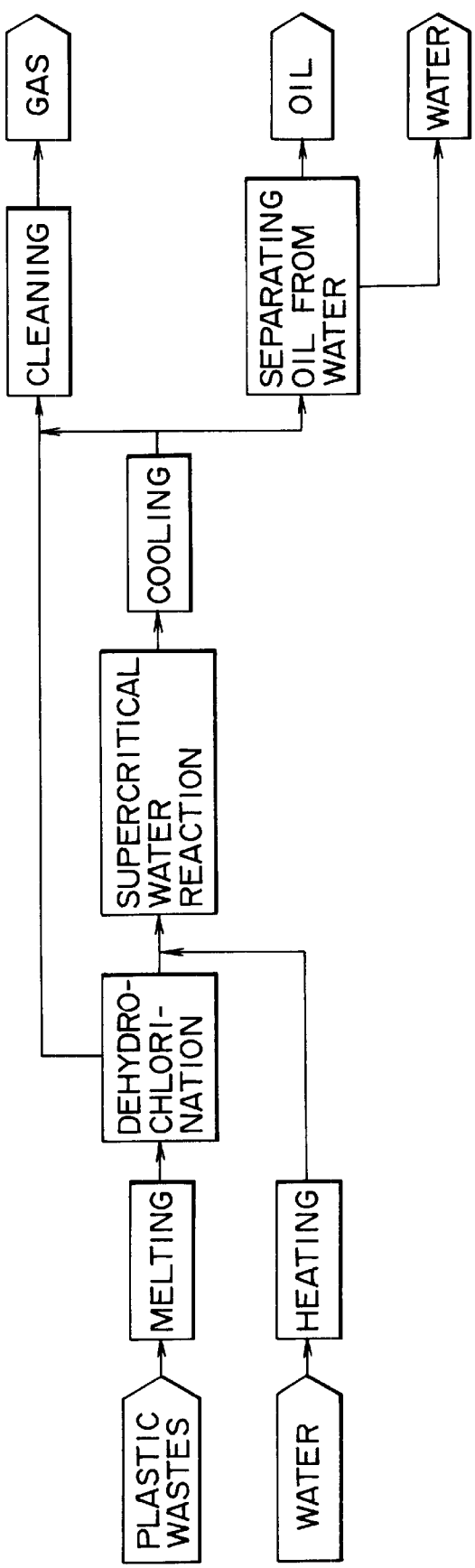
FIG. 2 is a system flowchart illustrating another embodiment of the present invention, which is another method and apparatus embodying the present invention.

Subsequently, in step (3), the reactant is cooled. Then, the separation of oil from water is performed. Thereafter, produced oil-like materials are collected. FIG. 2 is a system flowchart illustrating another embodiment of the present invention, which is another method and apparatus embodying the present invention. Namely, this embodiment has the step of removing hydrogen chloride before conducting the supercritical water reaction. Further, the decomposition of a plastic waste and the conversion of a plastic waste into oil are carried out in the following step (1) to (3).

In step (1), the plastic waste, which has undergone pretreatments such as crushing, separating and fractionating as needed, is heated and melted to thereby decompose a part or all of chlorine-base plastic contained in the plastic waste and separate and remove produced gaseous hydrogen chloride (a dehydrochlorination treatment). The separated and removed gaseous hydrogen chloride is cleaned and collected or is neutralized.

In step (2), the plastic waste and the water are pressurized upon completion of the treatment of step (1). Then, the plastic waste is mixed with the water. Thereafter, a supercritical water reaction is conducted. In this case, after mixing the plastic waste with water or hot water, the mixture may be heated in such a manner as to be in a supercritical or near supercritical region. Alternatively, the plastic waste may be mixed with supercritical water.

In step (3), the reactant is cooled. Subsequently, the separation of oil from water is performed. Thereafter, produced oil-like materials are collected. Incidentally, the decomposition gas generated in the supercritical water reaction can be cleaned and collected or can be neutralized.

Figure 3:
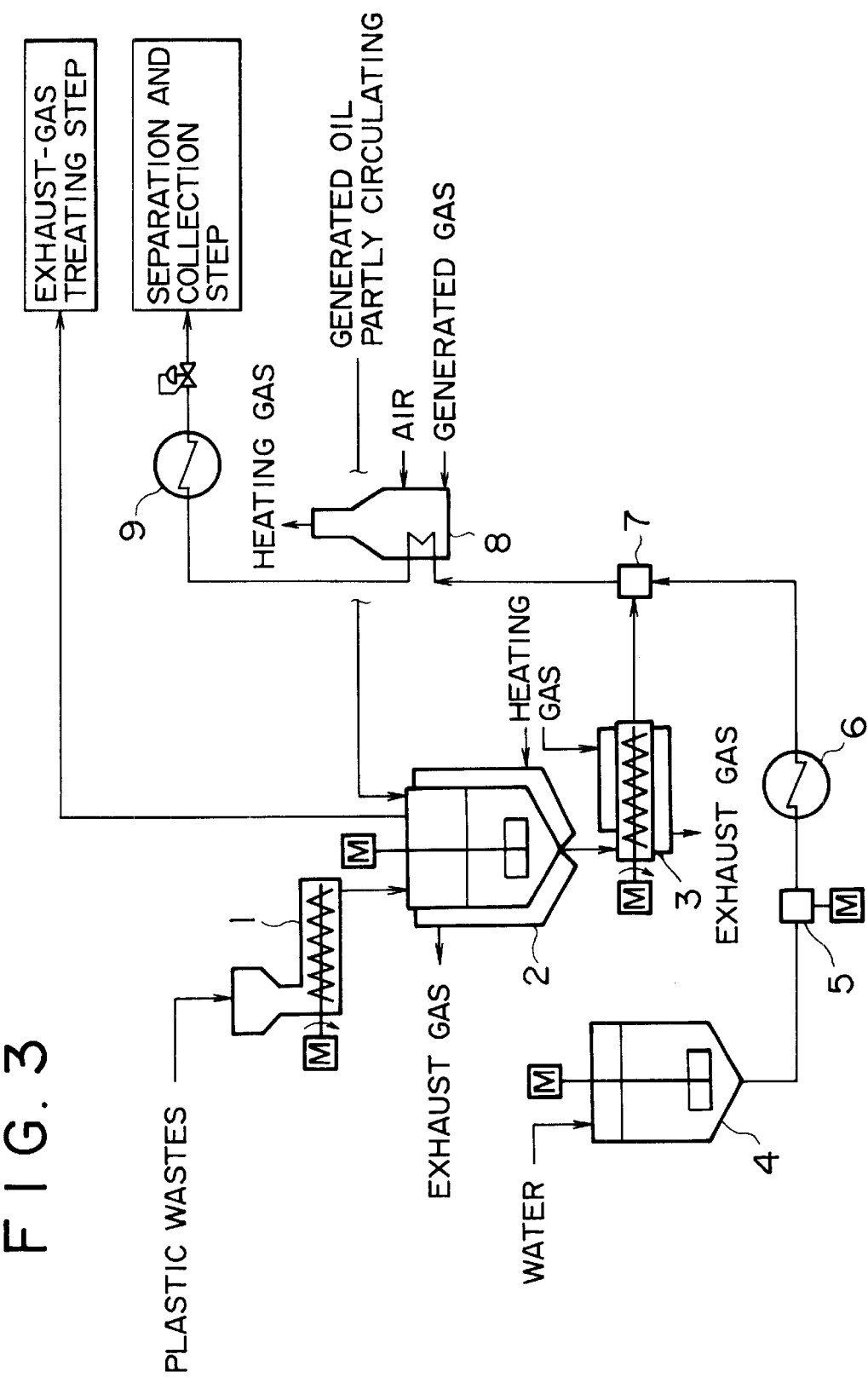
FIG. 3 is a schematic diagram illustrating the configuration of an apparatus for converting a plastic waste into oil according to the present invention, which is still another embodiment of the present invention.

FIG. 3 is a schematic diagram illustrating the configuration of an apparatus for converting a plastic waste into oil according to the present invention, which is still another embodiment of the present invention. In the apparatus of this figure, the plastic waste is supplied to a melting tank 2 of the vertical type or of the horizontal type (incidentally, the meting tank shown in this figure is of the vertical type) provided with agitating means through a feeder 1. In the melting tank 2, the plastic waste is heated to a temperature, which is in the range of 200 to 400° C., preferably, in the range of 250 to 350° C., and are thus melted. Decomposition gases, such as gaseous hydrogen chloride, generated at that time are emitted from an upper portion of the melting tank 2 and are further sent to an apparatus for performing an exhaust-gas treating step. A molten plastic waste is pressurized in a press fitting unit 3 provided with a single-shaft or two-shaft screw and is continuously press-fi into a mixer (or a mixing tube) 7.

On the other hand, water contained in a water regulating tank 4 is sent out by a pump 5 to a pre-heater 6 whereupon the sent water is heated to a temperature which is in the range of 200 to 600° C., preferably, in the range of 350 to 500° C. Then, the water is continuously press-fit into the mixer (or the mixing tube) 7 whereupon the water is mixed with the molten plastic waste. It is preferable that an amount of water added thereto, which is represented in terms of the ratio of the weight of the plastic waste to the weight of the added water, becomes within a range of 0.05 to 0.5.

Mixture of the molten plastic waste and the water is sent to a tubular type continuous reactor 8. This mixture, which is in a supercritical or near supercritical state, is heated in the reactor 8 and is decomposed in a short time (which is 5 minutes or less) into low-molecular-weight hydrocarbons. A plastic waste can be decomposed into oil, which is in any state from that of heavy oil to that of light oil, by suitably selecting the reaction temperature, the reaction pressure, the plastic-waste-to-water mixing ratio and the reaction time in the reactor 8.

Mixture of the low-molecular-weight hydrocarbon and the supercritical or near supercritical water is outputted from the reactor 8 is then cooled by a cooling unit 9. Thereafter, the mixture is sent to an apparatus for performing the step of separating and collecting. Thus, the low-molecular-weight hydrocarbons (oil) are collected therein.

Figure 4:
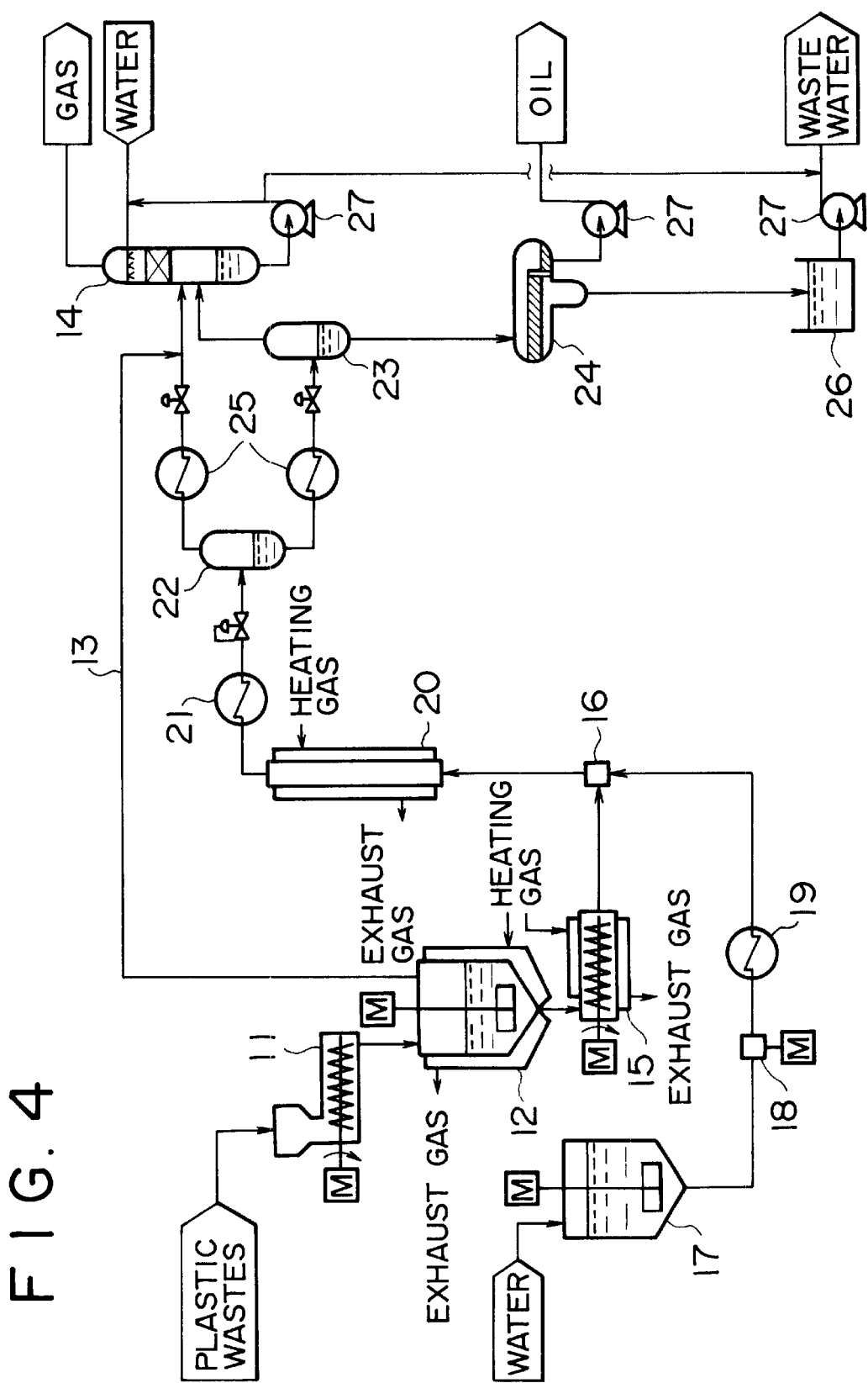
FIG. 4 is a schematic diagram illustrating the configuration of another apparatus for converting a plastic waste into oil according to the present invention, which is yet another embodiment of the present invention.

FIG. 4 is a schematic diagram illustrating the configuration of another apparatus for converting a plastic waste into oil according to the present invention, which is yet another embodiment of the present invention. In the apparatus illustrated in this figure, the plastic waste is supplied to a melting tank 12 of the vertical type or of the horizontal type (incidentally, the meting tank shown in this figure is of the vertical type) provided with agitating means through a feeder 11. In the melting tank 12, the plastic waste is heated to a temperature, which is in the range of 200 to 400° C., preferably, in the range of 250 to 350° C., and is thus melted. As a result, part or all of the chlorine-base plastics are decomposed, so that gaseous hydrogen chloride is generated. This gaseous hydrogen chloride is emitted from an upper portion of the melting tank 2 and is further sent to gaseous-hydrogen-chloride removing piping 13. Thus, this gaseous hydrogen chloride is removed during passing through the piping 13, and is then sent to a gas washer tower 14 where upon the gaseous hydrogen chloride is treated. The plastic waste, from which the gaseous hydrogen chloride has been removed, is pressurized in a press fitting unit 15 provided with a single-shaft or two-shaft screw and are continuously press-fit into a mixer (or a mixing tube) 16.

On the other hand, water contained in a water regulating tank 17 is sent out by a pump 18 to a pre-heater 19 whereupon the sent water is heated to a temperature which is in the range of 200 to 600° C., preferably, in the range of 350 to 500° C. Then, the water is continuously press-fit into the mixer (or the mixing tube) 16 whereupon the water is mixed with the molten plastic waste. It is preferable that an amount of water added thereto, which is represented in terms of the ratio of the weight of the plastic waste to the weight of the added water, becomes within a range of 0.05 to 0.5.

Mixture of the molten plastic waste and the water is sent to a reactor 20. This mixture, which is in a supercritical or near supercritical state, is heated in the reactor 20 to a temperature, which is in the range of 400 to 600° C., preferably, in the range of 450 to 550° C., and is decomposed in a short time at a pressure, which is in the range of 18 to 50 MPa, preferably, 22.1 to 35 MPa, into low-molecular-weight hydrocarbon. A plastic waste can be decomposed into oil, which is in any state from that of heavy oil to that of light oil, by suitably selecting the reaction temperature, the reaction pressure, the plastic-waste-to-water mixing ratio and the reaction time in the reactor 20.

Mixture of the low-molecular-weight hydrocarbon and the supercritical or near supercritical water, and is outputted from the reactor 20 is then cooled by a cooling unit 21. Thereafter, the mixture is sent to an apparatus for performing the step of separating generated gas from liquid in separation tanks 22, 23. The generated gas is sent to the gas washer tower 14 whereupon the gas was treated. The liquid component is separation tank 24. Water is sent to a waste water reservation tank 26, and then is treated as waste water. Thus, the low-molecular-weight hydrocarbons (oil) are collected. In FIG. 4, reference numeral 25 designates a cooling unit; 27 a pump.

Hereinafter, the methods of the present invention will be described more concretely by showing examples.

EXAMPLE 1

Tests on the decomposition of plastic waste samples of compositions Nos. 1 to 5, which are described in TABLE 1 (incidentally, PE designates polyethylene; PP polypropylene; PS polystyrene; and PVC polyvinyl chloride), and on the conversion of the samples into oil were performed by using the apparatus having the configuration of FIG. 3. Further, a tubular type continuous reactor constituted by a thick-walled reaction tube, whose inside diameter, outside diameter and length were 5 mm, 10 mm and 60 m, respectively, was used as the reactor 8. Moreover, each of the supplied plastic waste samples was continuously treated at a supply amount thereof, which was of 0.3 to 0.8 kg/h.

After heated to 350° C. in the melting tank 2 and melted therein, each of the samples was mixed with water heated to 420° C. Resultant mixture was then loaded into the reactor 8. Subsequently, a supercritical water reaction was conducted under the conditions described in TABLE 1. Results are listed in TABLE 1. It has been found from TABLE 1 that when the supercritical water reaction was conducted at a temperature of 480° C. (incidentally, 410° C. in the case of using PS singly), the decomposition of the plastic waste and the conversion thereof into oil were achieved in a short time of 5 minutes. Furthermore, a large amount of plastic waste could be continuously treated by the apparatus of the present invention.

Incidentally, in the case of this example, the plastic waste is heated and melted and were then mixed with water. However, similar results were obtained in the case that the plastic waste is crushed and is then mixed with water to be slurry-form.

TABLE 1

| Nos. | 1 | 2 | 3 | 4 | 5 |
|---|---|---|---|---|---|
| Conditions: | | | | | |
| Reaction Temperature (° C.) | 500 | 500 | 500 | 480 | 410 |
| Reaction Pressure (MPa) | 30 | 30 | 30 | 30 | 30 |
| Plastic-Water Ratio by Weight (—) | 0.2 | 0.2 | 0.2 | 0.2 | 0.2 |
| Reaction Time (min.) | 2 | 2 | 2 | 5 | 5 |
| Sample Composition wt % | | | | | |
| PE (polyethylene) | 100 | 0 | 0 | 32 | 0 |
| PP (polypropylene) | 0 | 100 | 0 | 21 | 0 |
| PS (polystyrene) | 0 | 0 | 0 | 24 | 100 |
| PVC (polyvinyl chloride) | 0 | 0 | 100 | 23 | 0 |

TABLE 1-continued

| Nos. | 1 | 2 | 3 | 4 | 5 |
|---|---|---|---|---|---|
| Conversion Ratio wt % | | | | | |
| Gas | 9 | 10 | 21 | 14 | 2 |
| Oil | 91 | 90 | 34 | 75 | 98 |
| Residue | 0 | 0 | 3 | 1 | 0 |
| HCl | — | — | 42 | 10 | — |

EXAMPLE 2

Tests on the decomposition of plastic waste samples of compositions Nos. 6 to 8, which are described in TABLE 2 and on the conversion of the samples into oil were performed by using the apparatus having the configuration of FIG. 4. Test process was as follows. Namely, each of the plastic waste samples was heated and melted in the melting tank 12 under the pretreatment conditions described in TABLE 2. Gaseous hydrogen chloride generated by the decomposition of chlorine-base plastic (polyvinyl chloride) was separated and removed from the plastic waste sample by being made to flow through the gaseous-hydrogen-chloride removing piping 13. Thereafter, the molten plastic waste was mixed with water heated to 420° C. in the mixer 16. Then, a resultant mixture was loaded into the reactor 20. Subsequently, a supercritical water reaction was carried out. As a result, there was hardly caused the corrosion of the apparatus due to the hydrogen chloride. Further, the conversion ratios owing to the decomposition and conversion of the plastic waste, and the hydrogen-chloride removing ratios are listed in TABLE 2. It has been found from TABLE 2 that the HCl (hydrogen-chloride) removing ratio of 99% or more was obtained in the stage of the pretreatment of the plastic waste containing chlorine-base plastic.

TABLE 2

| Nos. | 6 | 7 | 8 |
|---|---|---|---|
| Sample Composition wt % | | | |
| PE (polyethylene) | 0 | 75 | 32 |
| PP (polypropylene) | 0 | 0 | 21 |
| PS (polystyrene) | 0 | 0 | 24 |
| PVC (polyvinyl chloride) | 100 | 25 | 23 |
| Pretreatment | | | |
| Temperature (° C.) | 330 | 350 | 350 |
| Treatment Time (min.) | 30 | 20 | 20 |
| Reaction Conditions: | | | |
| Reaction Temperature (° C.) | 500 | 500 | 500 |
| Reaction Pressure (MPa) | 30 | 30 | 30 |
| Plastic-Water Ratio by Weight (–) | 0.15 | 0.15 | 0.15 |
| Reaction Time (min.) | 2 | 2 | 2 |
| Products Conversion Ratio wt % | | | |
| HCl | 42 | 10 | 10 |
| Gas | 20 | 13 | 17 |
| Oil | 36 | 76 | 72 |
| Residue | 2 | 1 | 1 |
| HCl Removing Ratio (wt %) | 99.2 | 99.7 | 99.8 |

Although the preferred embodiments of the present invention have been described above, it should be understood that the present invention is not limited thereto and that other modifications will be apparent to those skilled in the art without departing from the spirit of the invention.

The scope of the present invention, therefore, should be determined solely by the appended claims.

What is claimed is:

1. A method of converting a plastic waste containing chlorine-base plastic into oil consisting essentially of heating the plastic waste to decompose part or all of the chlorine-base plastic contained in the plastic waste;

separating and removing hydrogen chloride generated during the heating;

mixing the plastic waste, from which the hydrogen chloride is separated, with water; and decomposing the plastic waste in a supercritical or near-supercritical region, and recovering resultant oil, wherein said reactor is a stainless steel reactor.

2. The method according to claim 1, wherein the weight of the plastic waste to the weight of the added water is from 0.05 to 0.5.

3. The method according to claim 2, wherein the reaction pressure is from 18 to 50 MPa.

4. The method according to claim 3, wherein the reaction temperature is from 410 to 600° C.

5. The method according to claim 4, wherein the reaction temperature, reaction pressure, and plastic waste-to-water mixing ratio are selected to produce heavy oil.

6. The method of converting a plastic waste into oil according to claim 1, wherein a residence time of the plastic waste in the reactor is 5 minutes or less when conducting the reaction.

7. A method of converting a plastic waste into oil consisting essentially of mixing the plastic waste with water; and decomposing the plastic waste in a supercritical or near-supercritical region, and recovering resultant oil, wherein said reactor is a stainless steel reactor.

8. The method according to claim 7, wherein the weight of the plastic waste to the weight of the added water is from 0.05 to 0.5.

9. The method according to claim 7, wherein the reaction pressure is from 18 to 50 MPa.

10. The method according to claim 7, wherein the reaction temperature is from 410 to 600° C.

11. The method according to claim 7, wherein the reaction temperature, reaction pressure, and plastic waste-to-water mixing ratio are selected to produce heavy oil.

12. The method according to claim 7, wherein the weight of the plastic waste weight of the added water is from 0.05 to 0.5, the reaction pressure is from 18 to 50 MPa, reaction temperature is from 410 to 600° C., and heavy oil is recovered.

* * * * *